United States Patent [19]

Marsi

[11] Patent Number: 6,158,960
[45] Date of Patent: Dec. 12, 2000

[54] PROPELLER HUB WITH SELF-ADJUSTING PITCH MECHANISM

[76] Inventor: Joseph A. Marsi, 3 Avocado La., Rolling Hills, Calif. 90274

[21] Appl. No.: 09/193,673

[22] Filed: Nov. 17, 1998

Related U.S. Application Data

[60] Provisional application No. 60/065,599, Nov. 18, 1997.

[51] Int. Cl.$^7$ .................................................. B63H 3/00
[52] U.S. Cl. .............................................................. 416/43
[58] Field of Search ........................... 416/43, 147, 155, 416/151, 159, 160, 162

[56] References Cited

FOREIGN PATENT DOCUMENTS 467488  4/1936  United Kingdom ...................... 416/43

*Primary Examiner*—Edward K. Look
*Assistant Examiner*—Hermes Rodriguez
*Attorney, Agent, or Firm*—Roger A. Marrs

[57] ABSTRACT

A mechanism for automatically changing the pitch of propeller blades employing engine torque alone which increases with air speed. A powered hub mounts at least two blades and includes blade pitch changing elements automatically responsive to engine torque for changing blade pitch. The elements include a gear train having a drive gear and several driven gears with flexible coupling components interconnected therebetween. The flexible coupling includes a number of compressible components disposed in cavities in a circular array between the driving gear and the driven gears and which distort under torsional loads at a pre-determined rate.

As engine torque changes due to aerodynamic loads on the blades, the flexible coupling components distort causing the blades to change pitch angle.

5 Claims, 6 Drawing Sheets

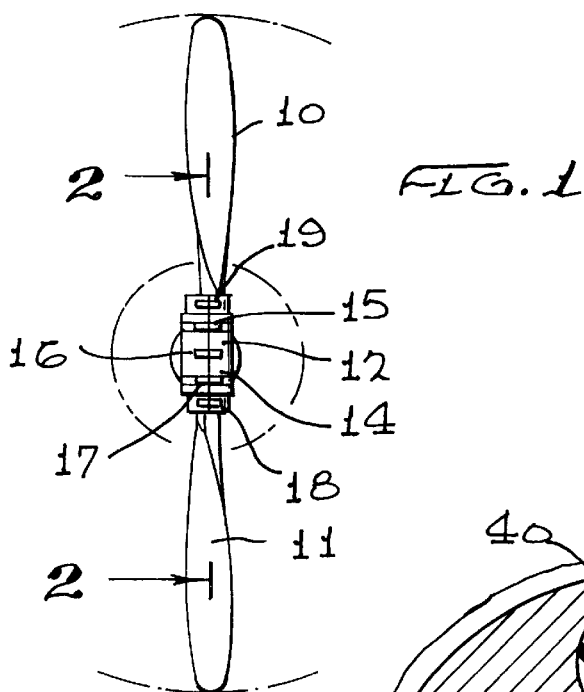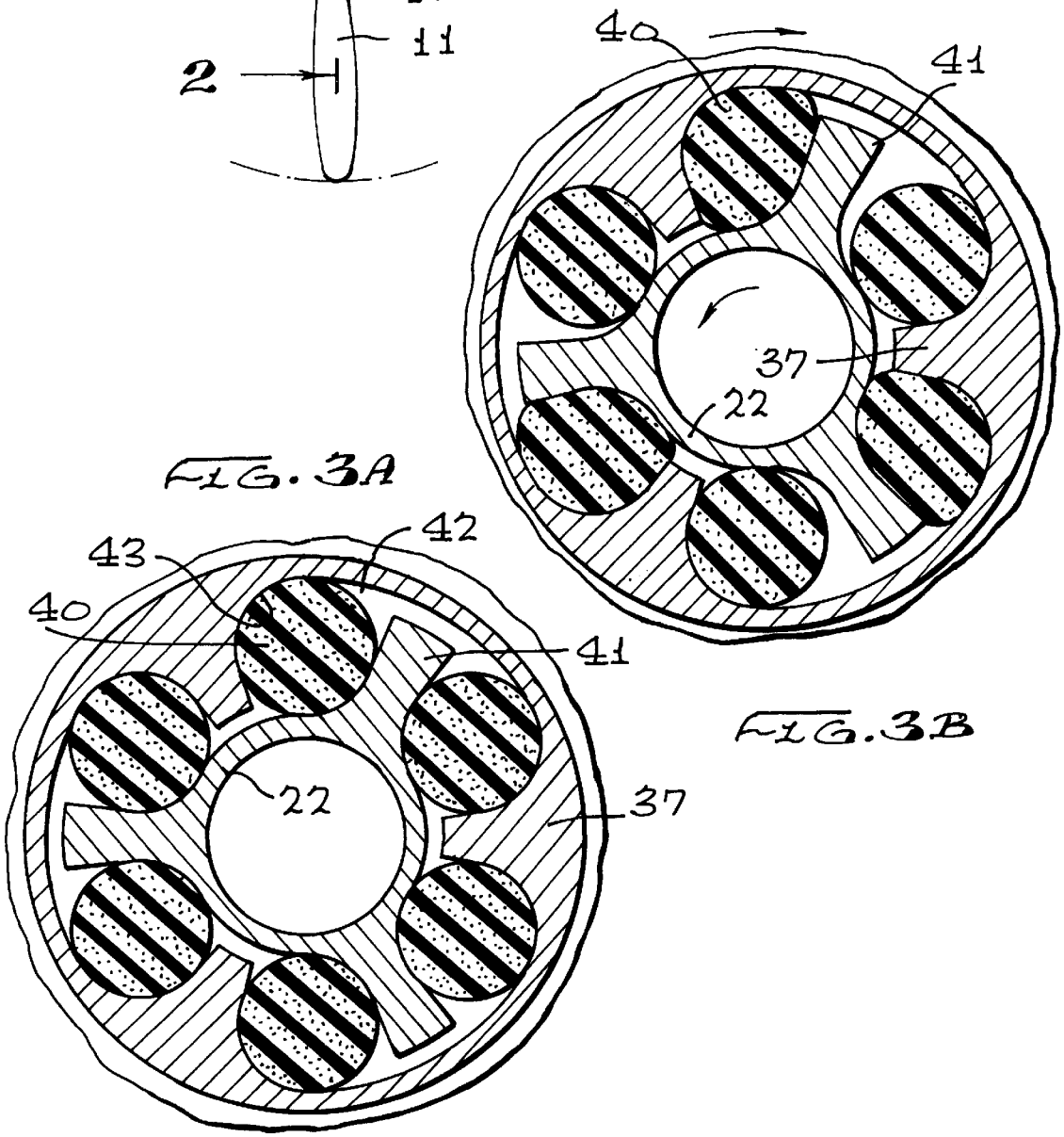

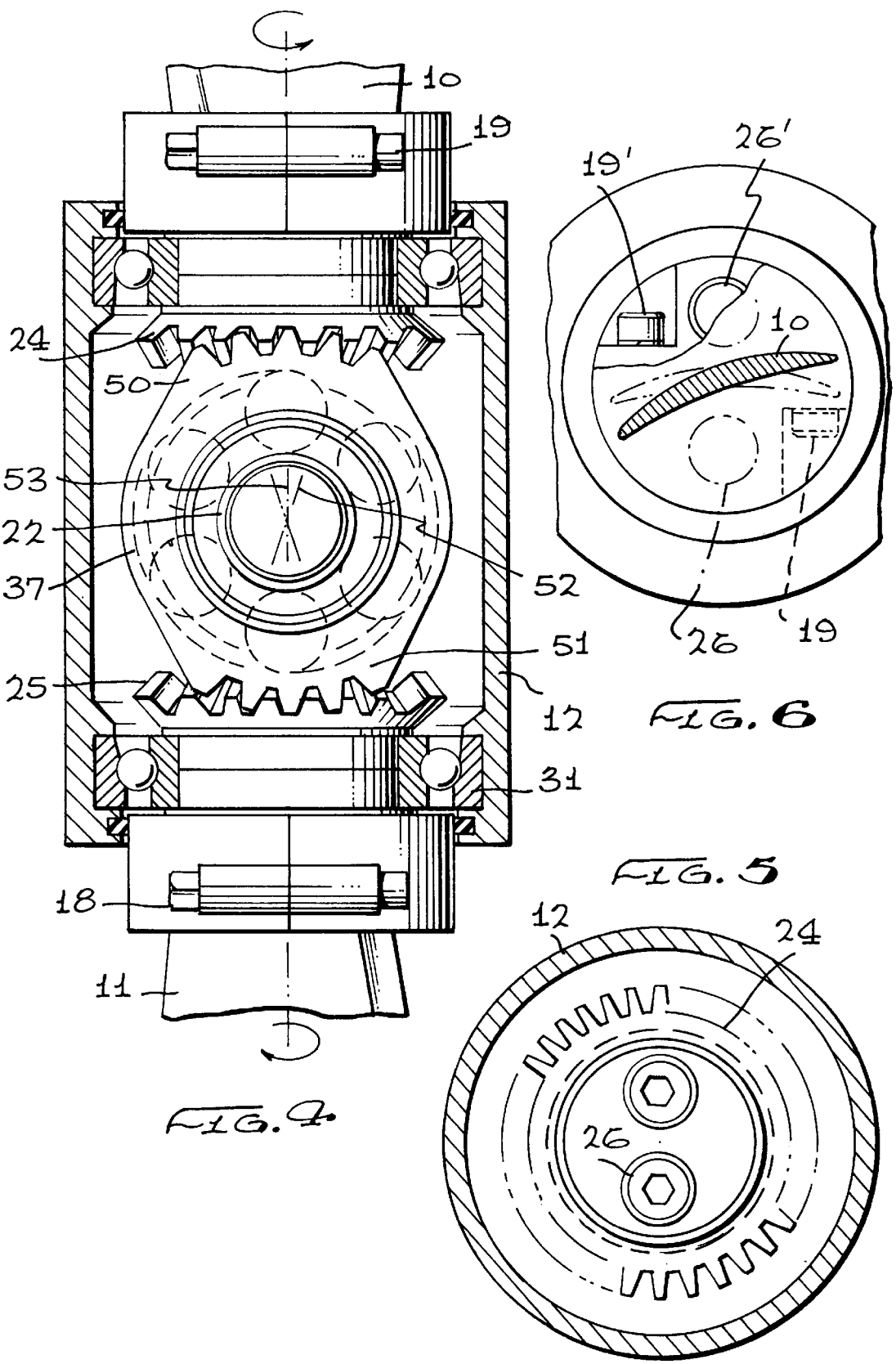

PROPELLER HUB WITH SELF-ADJUSTING PITCH MECHANISM

Priority claimed based on 60-065,599 filed Nov. 18, 1997.

BACKGROUND OF THE INVENTION

1. Field of the Invention

The present invention relates to a propeller pitch-change mechanism for a vehicle, such as aircraft, and more particularly to such a mechanism for automatically changing the pitch of propeller blades without the necessity of external power and which does not require operator or pilot adjustment.

2. Brief Description of the Prior Art

In the general field of propeller blade pitch control for vehicles, such as aircraft and boats, efficient operation of the vehicle requires that the propeller pitch be adjusted for an optimum angle of attack for each vehicle velocity so that the blades absorb the maximum power at a given air speed or boat speed. With respect to aircraft, this consideration provides low blade angles (low pitch) at low aircraft air speeds such as at aircraft takeoff, and at high pitch for aircraft cruising speeds.

In order to provide proper blade angle, current propeller designs of infinitely adjustable pitch mechanisms are activated by external power sources, such as hydraulic pressure or by electric motor. The external power sources may be assisted by centrifugal counterweights or the like. Constant speed propellers change their pitch angle to match air speeds at a constant engine RPM selected by the pilot. Other propellers have two pitch angles, one for climb and one for cruise, which are selected by the pilot during flight, while others have to be manually set on the ground. Non-automatic pitch change mechanism usually employs heavy motors and hydraulic systems that require special circuits, pressure lines or other added parts, all of which are weighty components and increase the overall weight and complexity of the mechanism. Particularly in aircraft installations, it is most important to keep weight and complexity as low as possible.

Some attempts have been made to provide proper adjustable pitch control which are disclosed in U.S. Pat. Nos. 3,635,583; 3,560,110; 2,396,630; 1,982,283 and 4,304,524. Although such mechanisms and adjustment means may adjustably control the pitch of propeller blades, such means are not automatic and still encompass problems noted above. In some instances, torsion springs are employed but such engine torque pitch control adjustment is relatively insensitive to automatic adjustment and is subject to material fatigue.

Therefore, a long-standing need has existed to provide a propeller pitch-change mechanism for vehicles such that the operation of the mechanism is completely automatic and does not require external power nor intervention by the pilot.

SUMMARY OF THE INVENTION

Accordingly, the above problems and difficulties are avoided by the present invention by providing a novel mechanism for automatically changing propeller pitch by employing engine torque alone which increases with air speed.

In one form of the invention, a hub is employed for mounting at least two propeller blades and the hub is operably connected to a power source, such as an aircraft engine, so that the rotating propeller advances the aircraft through the air. Means are carried in the hub automatically responsive to engine torque for increasing and decreasing the propeller pitch of each blade. Such means includes a gear train having a driving gear and several driven gears with flexible coupling means interposed therebetween. Rotation of the driven gears is possible only if the flexible coupling means rotate with respect to each other so as to correspond with engine torque. Thus, engine torque causes the entire hub to turn at engine speed as well as to automatically adjust propeller blade pitch. The flexible coupling may be a number of compressible elements such as cylindrical elastomer blocks that deflect or distort under torsional loads at a predetermined rate. Each compressible element is characterized by having the ability to expand into its original configuration upon the release or withdrawal of load forces. The compressible elements are disposed in cavities arranged in a circular manner between the driving gear and the driven gears. Therefore, as engine torque changes due to aerodynamic loads on the blades, the flexible coupling elements compress or distort which causes the blades to rotate and changes pitch angle.

Therefore, it is among the primary objects of the present invention to provide a self-adjusting pitch mechanism for a propeller which incorporates a pitch-change mechanism that is completely automatic and which is responsive to change in accordance with engine torque.

Another object of the present invention is to provide a self-adjusting pitch mechanism for propellers in which flexible couplings operable between an engine torque drive gear and driven gears that is responsive to engine torque for causing the propeller hub assembly to turn at engine speed as well as to rotate propeller blades in their bearings for automatic pitch change.

Still a further object of the present invention is to provide a novel propeller pitch self-adjusting mechanism that does not require external power or intervention by the vehicle operator or pilot whereby the mechanism is powered solely by the vehicle power plant and specifically by engine torque in response to increases in air speed.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front elevational view of a propeller having the self-adjusting pitch mechanism incorporated therein;

FIG. 3A is a cross-sectional view of the flexible coupling incorporated into the self-adjusting pitch mechanism shown in FIG. 2 as taken in the direction of arrows 3A—3A thereof;

FIG. 3B is a view similar to the view of FIG. 3A illustrating the compression or distortion of the flexible coupling in response to change of engine torque;

FIG. 4 is a cross-sectional view of the driving and driven gears as taken in the direction of arrows 4—4 of FIG. 2;

FIG. 5 is a transverse cross-sectional view of the gear train employed in the self-adjusting pitch mechanism as illustrated in the direction of arrows 5—5 of FIG. 2; and FIG. 6 is a transverse cross-sectional view of a propeller blade as shown in FIG. 2 as taken in the direction of arrows 6—6.

DESCRIPTION OF THE PREFERRED EMBODIMENT

Figure 2:
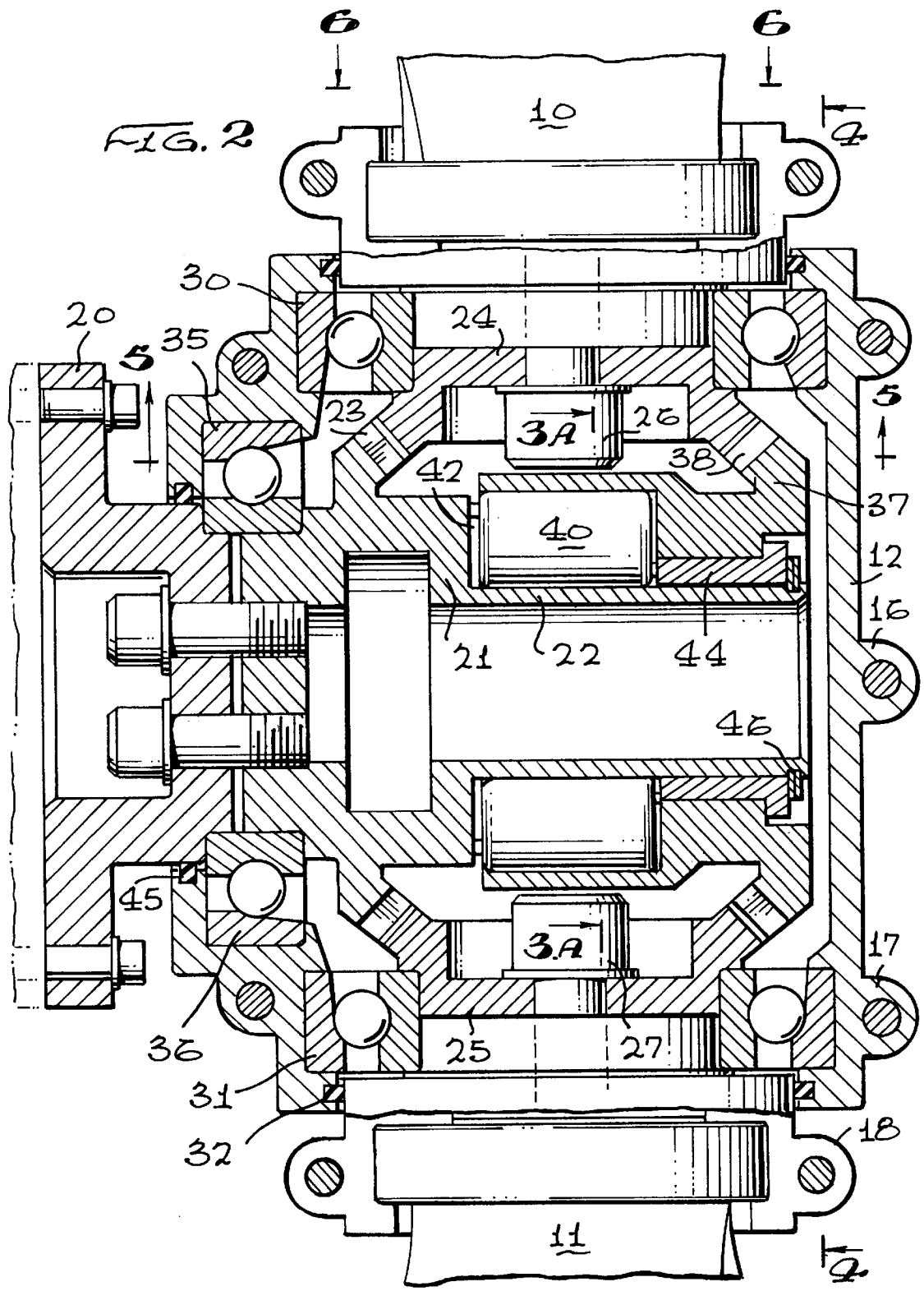
FIG. 2 is an enlarged longitudinal cross-sectional view of the propeller hub shown in FIG. 1 as taken in the direction of arrows 2—2 thereof.

Referring to FIG. 1, a propeller is illustrated having at least two blades, such as blade 10 and blade 11, which are outwardly projecting and cantilevered from a central hub 12. The blades and hub are operably connected to a power plant for rotating the hub and blades in order to attain a given speed for vehicles such as an aircraft. Engine torque increases with air speed and maximum torque is reached at design aircraft velocity. Specific torque values can be assigned to each air speed and the pitch of the blades 11 and 12 is automatically adjusted in response to change of torque value. The hub 12 is composed of a pair of clamp halves, indicated by numerals 13 and 14, which are held together in a clamped relationship by means of bolts and capscrews, broadly indicated by numerals 15, 16 and 17 respectively. Bolts and capscrews 18 and 19 are employed to mount bearings and propeller gears, as will be described later.

Referring now in detail to FIG. 2, the hub and propeller blades are driven from a power plant such as an aircraft engine via a drive gear flange 20 which is bolted to an internal drive gear 21. The drive gear 21 includes an elongated sleeve 22 and includes a toothed ring gear 23. The toothed ring gear 23 is meshed with a bevel gear associated with each of the respective blades. Bevel gear 24 is associated with blade 10 and bevel gear 25 is associated with blade 11. The respective bevel gears are connected to the respective blades by bolt means, such as indicated by numeral 26 with respect to gear 24 and bolt 27 with respect to gear 25 and blade 11.

It is also to be noted that the blades 10 and 11 are rotatably supported on bearings 30 and 31 with the inner race serving to support the blades while the outer race is carried on the housing. Seals 32 and 33 are carried on the housing and wipe against the mount of the respective blades 10 and 11 which are clamped by the bolt and clamps.

The hub and the blades are rotated in unison by means of the drive flange 20 and drive gear 21 supported on bearings 35 and 36.

In order to provide for automatic pitch adjustment, the invention further includes a torque driven gear 37 which includes meshed teeth that are engageable with a portion of the teeth carried on the bevel gear 24. The same arrangement is shown with respect to the teeth of torque driven gear 37 with respect to the bevel gear 25. A flexible coupling means is disposed between the torque driven gear 37 and the sleeve 22 of the drive gear 21. In one form of the invention, the flexible coupling means includes a plurality of compressible elements, such as element or block 40 that in one form may be an elastomeric cylindrical member, As illustrated, such as shown in FIG. 3A, six elastomer members are illustrated as being disposed in a cavity defined between surfaces of fingers outwardly projecting from sleeve 22 and semi-circular portions formed in the torque driven gear 37. A finger carried on sleeve 22 is indicated by numeral 41 while the cavity is indicated by numeral 42 and a typical semicircular or curved surface is shown by numeral 43.

In further respect of FIG. 2, it can be seen that the torque driven gear 37 is mounted on a journal bearing 44 and that this is a non-load bearing member. A seal 45 is provided between the housing 12 and the drive flange 20. Therefore, it can be seen that the power plant drives the flange 20 and drive gear 21 on its bearing 35 with respect to the hub housing 12. This action causes the hub and propeller blades 10 and 11 to rotate in order to drive the aircraft forward. During rotation of the hub and propellers, torque is experienced and as speed changes, torque changes and the propeller blades change pitch in response to the change of torque. This change is reflected through the torque driven gear 37 and the respective bevel gears 24 and 25. As the driven gear 37 rotates on its bearing 44 in response to the torque change, the elastomer blocks or members 40 are compressed within their respective cavities or cells.

Referring now to FIG. 3A, a no-load condition is illustrated where the respective elastomer elements or blocks 40 are not under any particular load which would cause change of pitch. Each of the respective elements or blocks 40 substantially occupies its cavity 42 but the cavity is not fully occupied.

When torque is applied to the driven gear 37, the condition shown in FIG. 3B is experienced wherein the elements, such as element 40, fully occupy the cavity since the volumetric area of the cavity has been reduced due to the counter-rotational disposition of drive gear sleeve 22 and the torque driven gear 37. The elastomer elements or blocks are compressed and distorted so as to occupy the cavity 42. Thus, the change of pitch is experienced by each of the respective blades.

Referring now in detail to FIG. 4, it can be seen that the torque driven gear 37 is of an oval shape having an upper row of teeth, as indicated by numeral 50, and a lower row of teeth, indicated by numeral 51. These teeth are enmeshed with the teeth of bevel gear 24 and bevel gear 25 respectively so that the torque driven qear 37 will rotate to a position shown by center line 52 disposed at an angle with respect to the longitudinal central axis of the hub, indicated by numeral 53.

In FIG. 5, it can be seen that the bevel gear 24 is retained to the propeller blade by studs or bolts 26 and 26'. FIG. 6 illustrates the angular positioning of the blades, such as blade 10, to change pitch in response to changes of engine torque.

Figure 7:
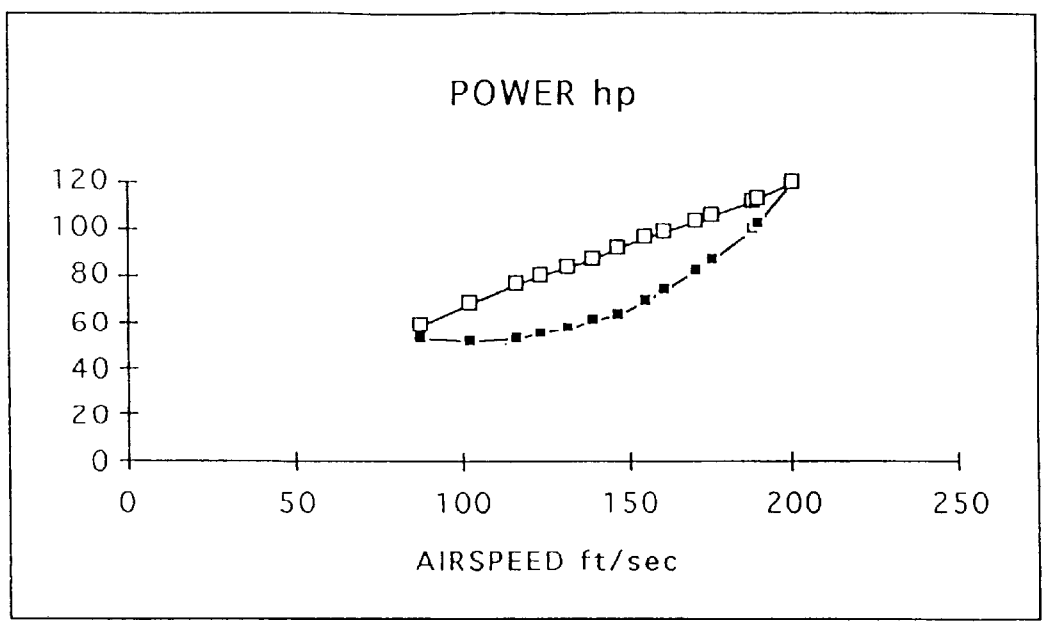
Figure 8:
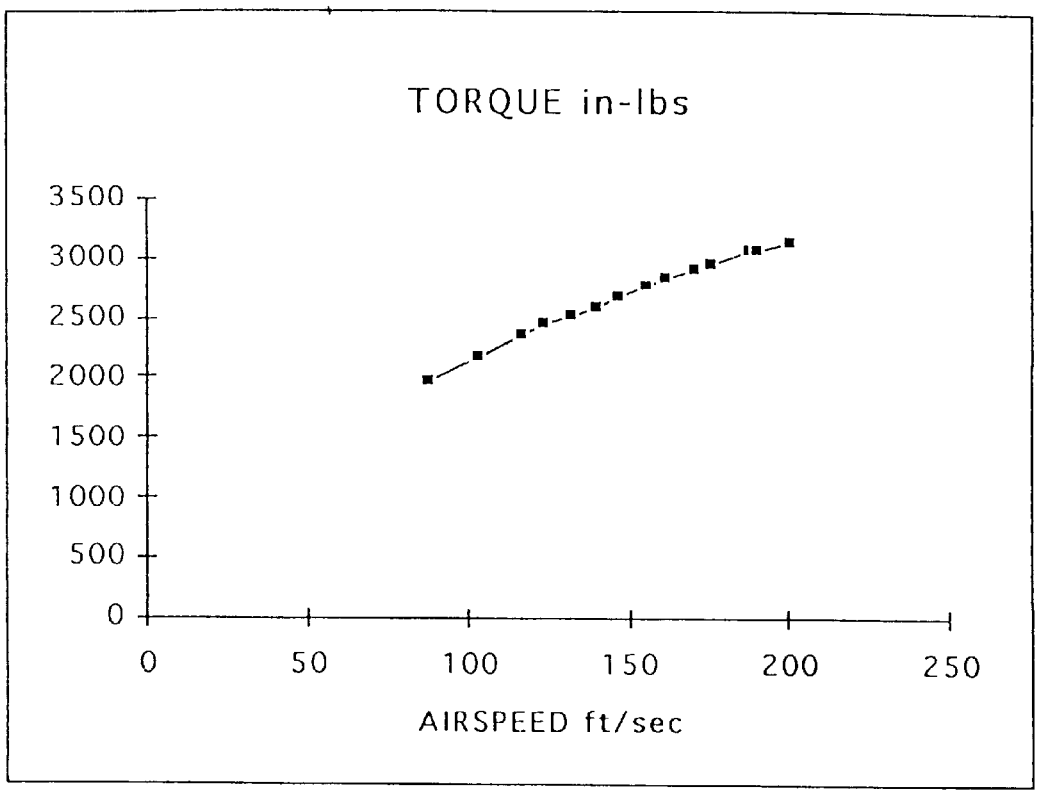

Therefore, the inventive mechanism is powered by the engine itself, and more specifically by the engine torque which increases with air speed. An aircraft with 160 hp engine may be used as an example. A chart is illustrated in FIG. 7 which shows the power curve of such an aircraft using a propeller of 74 inch diameter and 60 inch pitch with a design speed of 200.8 ft/sec (139 mph) at 75% engine power (120 hp). The lower curve shows the power required, and the top curve shows the power available. The corresponding engine torque is illustrated in the chart shown in FIG. 8. Engine torque increases with airspeed and maximum torque is reached at design aircraft velocity. As the curves in the chart show, there is a specific torque value that corresponds to each indicated airspeed.

In one embodiment of the invention, the propeller hub 12 encloses four bevel gears, such as represented by bevel gears 24 and 25 wherein one bevel gear is mounted on each propeller blade coaxially disposed with respect to a vertical longitudinal center line. One bevel gear is driven by the crankshaft through the flange 20 to which the gear 21 is bolted. The gear ratio may be 1.1917. On the same horizontal centerline, the fourth torque driven gear 37 is operated by the driving gear 21 through a flexible coupling means taking the form of the plurality of deformable or compressible elastomer elements or blocks 40. Each coupling half is an integral part of the gear. Each gear meshes with two adjacent gears. Rotation of each gear is possible only if the flexible coupling halves rotate with respect to each other so as to correspond with engine torque. Engine torque causes the entire hub to turn at engine speed as well as the propeller blades to rotate in their bearings 30 and 31 which causes the blades to change pitch. The driving gear and the propellers are contained in angular contact ballbearings for the thrust and centrifugal loads, respectively. The torque gear 37 is centered on the sleeve portion of the driving gear 21 through a journal bearing 44 and locked axially with a spiral-wound lock ring 4 in the sleeve 22. Each propeller is mounted in a split clamp with bolts and capscrews and the bearings and the propeller gears are mounted with these capscrews. The entire assmebly is contained in a split housing.

Figure 9:
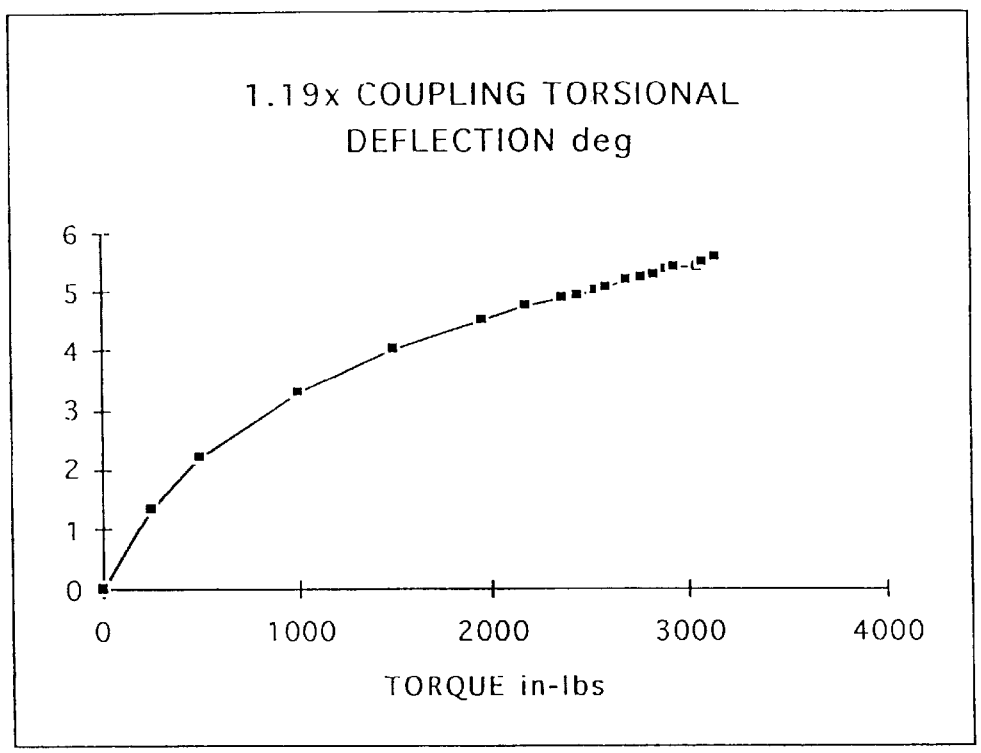

The flexible coupling means consists of a plurality of cylindrical elastomer elements, blocks or members which deflect under torsional loads at a pre-determined rate. Coupling selection is based on torque transmitted per rotational speed and the desired tortional stiffness of the coupling can be reached by selecting the number and Shore hardness of the elastomer blocks. In the current example, blocks of 80 Shore hardness were selected. FIG. 9 illustrates the deflection characteristics of the coupling, multipled by gear ratio of 1.1917 which is the angle by which the pitch angle is changed from the zero-torque position.

Figure 10:
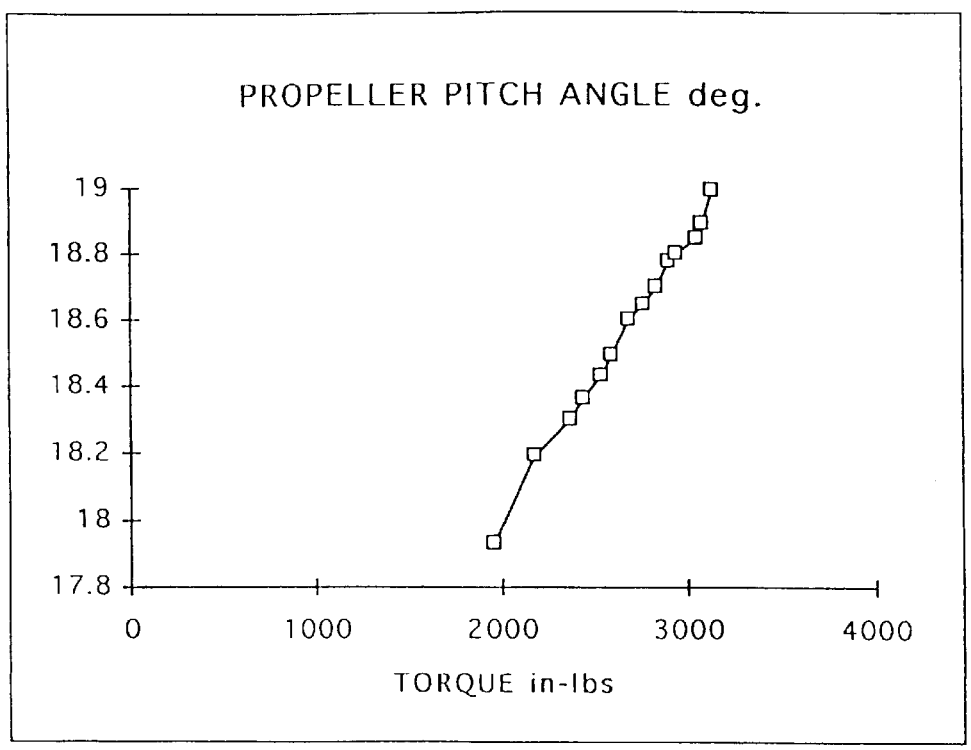

The curve illustrated in FIG. 9 shows that a maximum torque (3137 in-lbs at design speed) the coupling allows a blade rotation of 5.57 degrees, so the propeller blades have to be installed at a pitch angle 5.57 degress less than the pitch angle that corresponds to the maximum pitch of 60 inches which is 18.99 degrees. The initial pitch angle, therefore, is 18.99–5.57=13.42 degrees which corresponds to a propeller pitch of 41.6 inch. The propeller pitch angle will vary with the torque at each airspeed as plotted in FIG. 10.

Figure 11:
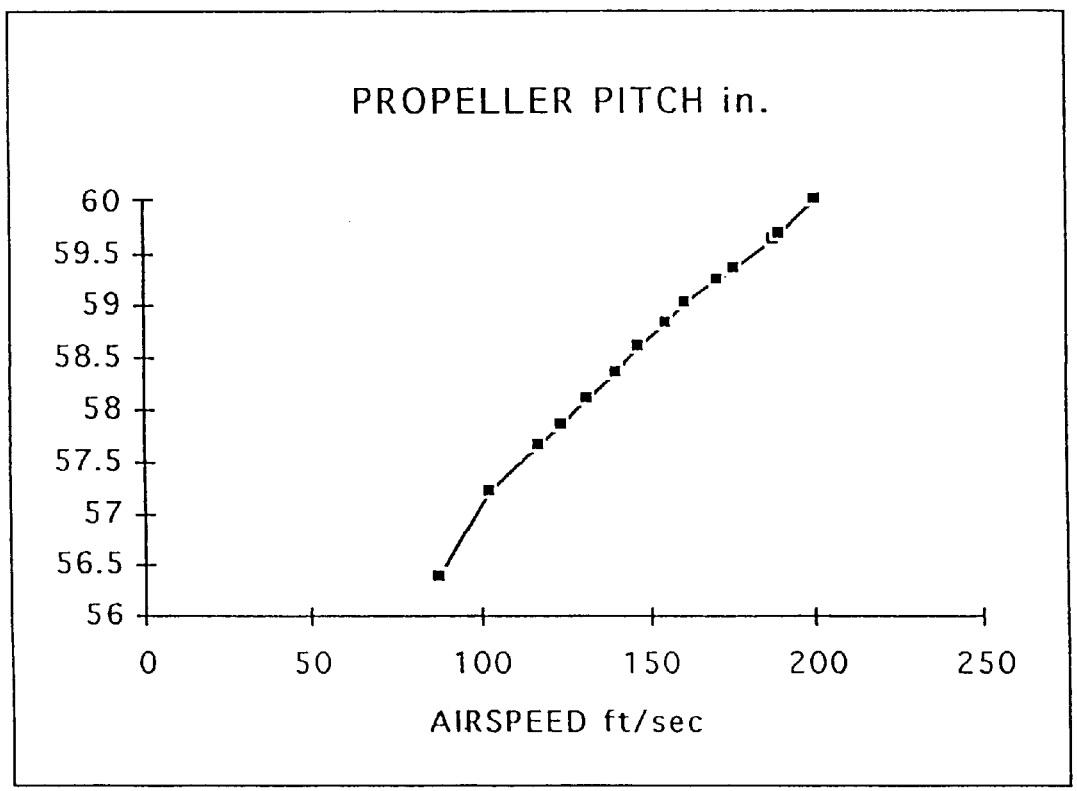

Referring now to FIG. 11, the propeller pitch that corresponds to these angles is plotted for airspeeds of 88 to 200.8 ft/secs. (60 to 139 mph) at 88 ft/sec, the pitch is 56.4 in.; however, at 0 rpm, it is 41.6 in. The first and last teeth of the torque gear 37 are imperfect so they do not mesh; these teeth serve as low and high pitch stops.

When the aircraft is in a climb condition, the propeller blade on the downturn is in a higher angle of attack than the one on the upturn which causes fluctuating twisting moments on the blades; however, as the blades are locked against each other through the gears, these moments are cancelled. The elastomer flexible coupling means has good vibration damping characteristics and absorbs cyclic loads from the propeller blades.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A mechanism for automatically changing the pitch of propeller blades in response to changes of engine torque as influenced by air speed comprising:

a rotatable powered hub;

at least a pair of blades outwardly projecting from said hub;

an engine power source connected to said hub for inducing rotation thereof;

means carried in said hub and operably coupled with said blades which are responsive to engine torque for increasing and decreasing propeller pitch of each of said blades;

said coupling means includes a gear train having a driving gear and several driven gears; and flexible coupling means interposed between said driving gear and said driven gears whereby rotation of said driven gears is only when said flexible coupling means rotate with respect to each other so as to correspond with engine torque.

2. The mechanism as defined in claim 1 wherein:

said flexible coupling is a plurality of compressible elements that deflect or distort under torsional loads at a predetermined rate.

3. The mechanism as defined in claim 2 wherein:

each of said compressible elements is characterized as having the ability to expand or return into its original configuration upon release or withdrawal of load forces.

4. The mechanism as defined in claim 3 wherein:

each of said compressable elements is a cylindrical elastomer block.

5. The mechanism as defined in claim 3 wherein:

each of said driven gears and said driving gear include overlapping and spaced-apart flanges defining cavities occupied by each of said flexible compressive elements and arranged in a circular manner or array between said driving gear and said driven gears whereby as engine torque changes due to aerodynamic loads on said blades, said flexible coupling compressive elements compress or distort to cause said blades to rotate and change pitch angle.

* * * * *